July 31, 1962  J. ISREELI  3,046,831
COLORIMETER FLOW CUVETTES
Filed Sept. 12, 1958  2 Sheets-Sheet 2
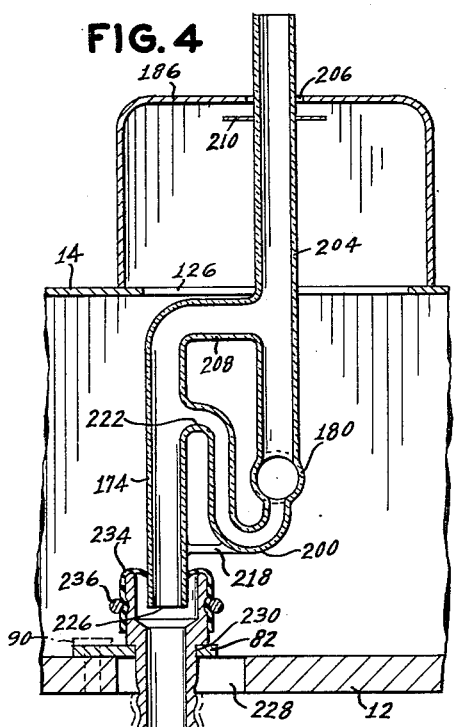
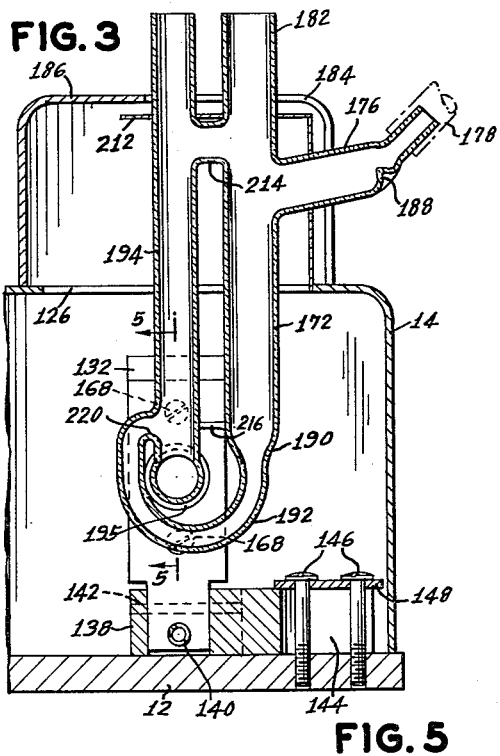
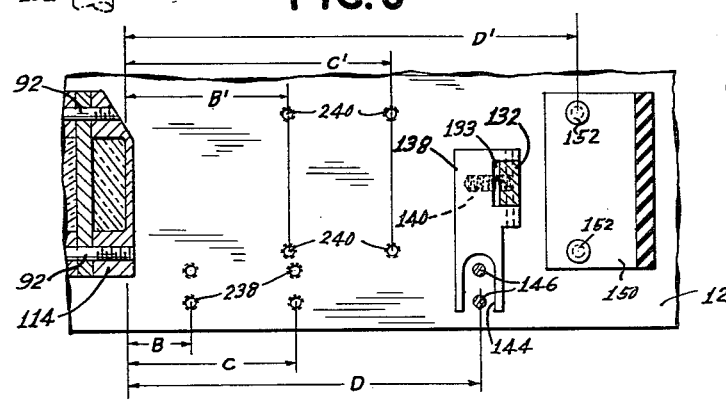
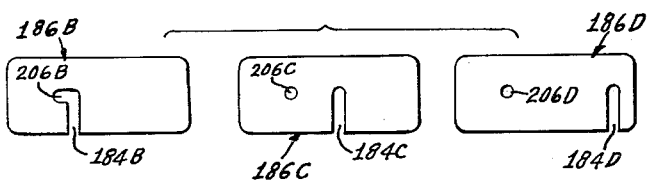
INVENTOR.
Jack Isreeli
BY
ATTORNEYS United States Patent Office 3,046,831
Patented July 31, 1962

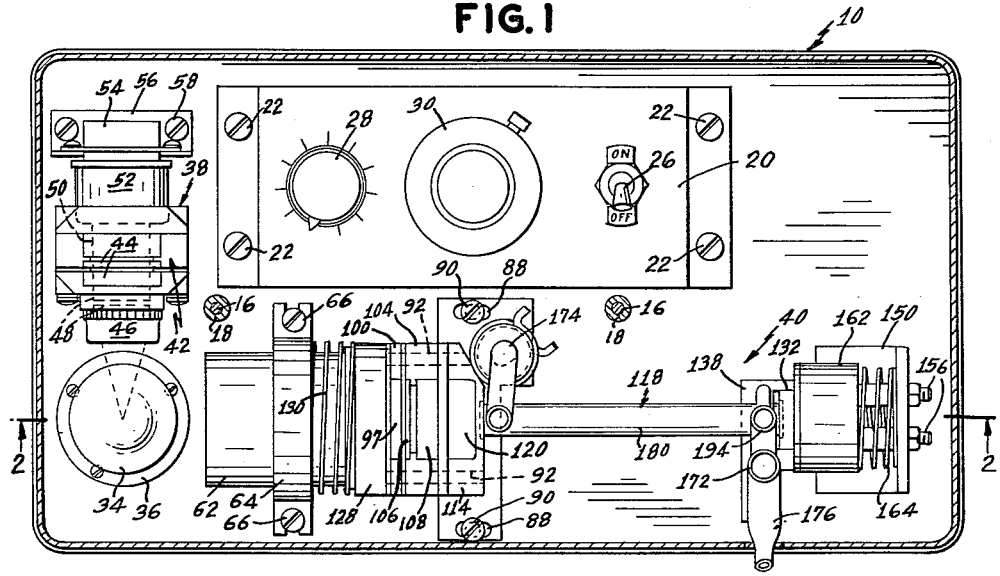

3,046,831
COLORIMETER FLOW CUVETTES
Jack Isreeli, Tuckahoe, N.Y., assignor to Technicon Instruments Corporation, Chauncey, N.Y., a corporation of New York
Filed Sept. 12, 1958, Ser. No. 760,687
8 Claims. (Cl. 88—14)

The present invention relates to colorimeters and, in particular, to colorimeter flow cuvettes for the photoelectric viewing of a stream of liquid samples or the like.

An object of the present invention is the provision of a light exposure flow cuvette for a colorimeter which has provision for photo-electric viewing of the absorption of light of a sample of fluid therein.

Another object of the present invention is the provision of a light exposure flow cuvette for a colorimeter which has provision for obtaining a long path for the light through the fluid sample therein with a minimum volume of the sample in the path.

A further object of the present invention is the provision for mounting a flow cuvette in a colorimeter wherein the flow cuvette may be readily removed and replaced, as may be required, for inspection, cleaning, and other necessary jobs.

A still further object of the invention is to provide an adjustable support for the flow cuvette to accommodate flow cuvettes of different sizes which are used for sample fluids having varying concentrations of substances therein.

A further object of the invention is to provide an adjustable support for the flow cuvette so that the position of the flow cuvette may be adjusted to focus the light on a predetermined portion thereon.

The above and other objects, features and advantages of the present invention will be more fully understood from the following description considered in connection with the accompanying illustrative drawings.

In the drawings, which illustrate the best mode presently contemplated of carrying out the invention:

FIG. 1 is a top plan view of a colorimeter pursuant to the present invention, with parts thereof removed for purposes of illustration;

FIG. 2 is a sectional view, taken on line 2—2 of FIG. 1, including the removed parts;

FIG. 3 is a fragmentary view, in section, taken on line 3—3 of FIGURE 2;

FIG. 4 is a fragmentary view, in section, taken on line 4—4 of FIG. 2;

FIG. 5 is a detailed sectional view, taken on line 5—5 of FIG. 3;

FIG. 6 is a fragmentary view, in section, taken on line 6—6 of FIG. 2; and

FIG. 7 is a plan view, of the various covers used in the colorimeter of the present invention.

Referring now to the drawings in detail, there is shown a colorimeter generally designated by the reference numeral 10. The colorimeter 10 is of a type which is especially well-adapted to provide a continuous colorimetric analysis or evaluation of a liquid stream or a stream of successive liquid samples. In this connection, the colorimeter 10 is especially useful in connection with an apparatus for automatically analyzing fluids, such as that illustrated and described in U.S. Patent No. 2,797,149, issued to the assignee of the present application. However, it will be understood that the colorimeter of the present invention is not limited to use with a fluid analyzing apparatus, and further, it is within the scope of the present invention to use the colorimeter 10 in connection with any type of liquid which is suitable for colorimetric examination.

As here shown, the colorimeter is provided with a base or casting 12 formed of a suitable metal and on which the various components of the colorimeter are mounted. A housing 14 is removably secured on the base 12 by means of the securing elements 16 which are threaded into sleeves 18 provided on the base 12. Various components of the colorimeter are enclosed within the housing 14, as hereinafter described in detail. A plate 20 is suitably secured in position, upwardly of the base 12, by securing elements 22 which extend through spaces or sleeves 24 for engagement with the base, as best seen in FIGURE 2. It will be understood that the plate 20 is accessible through the housing 14 and constitutes a control panel for a power switch 26 and manual controls 28 and 30. A removable cover 32 is provided on the plate 20 for obtaining access to the control panel.

An electric light source 34 is suitably mounted on the base 12, by means of a bracket or holder 36 and provides a source of light both for a standard or reference assembly, generally indicated by the reference numeral 38 and for a sample assembly, generally indicated by the reference numeral 40, it being noted that said assemblies, 38 and 40, are disposed at right angles to each other. The reference assembly 38 is constituted by a suitable filter housing assembly 42, provided with spaces 44 for various filters to eliminate light interference, to eliminate secondary wave lengths of light, and other adverse light effects. Mounted on the filter housing assembly 42 is a light inlet tube 46. The light inlet tube 46 is provided with suitable lenses 48 to form a beam of light 50, passing through the filter housing assembly 42, to energize a photo-electric device 52, connected to a plug-in socket 54 suitably mounted by a bracket 56, secured to the base 12 by securing means 58. The filter housing assembly 42 extends through a suitable opening provided in the top of the housing 14, for access thereto and a separate removable cover 60 is provided on the housing 14 for the filter housing assembly 42.

The sample assembly 40 includes a light-tight cylindrical member 62 which is horizontally mounted in an annular mounting member 64, the annular mounting member 64 being secured to the base 12 by the securing elements 66. Concave mirrors 68 and 70 are mounted in confronting relation at the opposite ends of the cylindrical member 62, thereby closing said opposite ends. The mirrors are preferably of the type wherein the mirrored surface is constituted by the front surface thereof. Mirror 68 is provided with a central aperture 72 and mirror 70 is provided with a similar aperture 74. As best seen in FIGURE 2, light from the source 34 enters through the mirror 68 and strikes the concave reflecting surface of mirror 70, as indicated by the light rays R1, which are then reflected by the mirror 70 onto the concave mirrored surface of the mirror 68. The latter focuses the light, as indicated by the rays R2 to pass through the opening 74 in mirror 70, and to focus at the focal point 76. The focal point 76 is preferably located at one end of a flow cuvette which will be described in detail hereinafter.

Mounted forwardly of light-tight cylindrical member 62 is an L-shaped bracket 78 having an aperture 80 therein for the passage of light rays R2. Depending from the short leg 82 of L-shaped bracket 78 is a projecting member 84 adapted to slide, in a path parallel to the light rays, in a slot 86 in base 12. Elongated slots 88 are provided in leg 82 of bracket 78 to permit the adjustment of bracket 78 along the path of light rays R2, bracket 78 being secured to base 12 by securing members 90. As will be understood from the following description, adjustment of bracket 78 will position the flow cuvette so that focal point 76 will be at one end of the flow cuvette.

Mounted to brackets 78, by securing elements 92, is a filter assembly 94, comprising a light inlet side consisting of spaced members 96, each of said members having apertures 98 therein, members 96 being separated from each other by U-shaped member 100 to form a compartment 97 for filter member 102. Disposed between members 96 and bracket 78 are spacers 104, forming filter compartments 106 and 108, each having therein, respectively, filters 110 and 112. At the light outlet end of filter assembly 94 is a support member 114, having a stepped aperture 116, therein for passage of light therethrough and for supporting one end of a flow cuvette 118. Support member 114 is provided with compartment 120 to receive a filter 122.

It will be noted that aperture 74 in mirror 70 and apertures 98, at the light inlet side of filter assembly 94, are laterally spaced from each other as by the spacing 124. Spacing 124 underlies an opening 126 in the housing 14. A light shield, in the form of an annular sleeve or light-tight tubular member 128, is slidably mounted on the periphery of the cylindrical member 62, and a compression spring 130 is seated around the periphery of cylindrical member 62, between the annular mounting member 64 and the sleeve 128. The spring 130 normally biases the sleeve 128 against the first member 96 so as to form a light tight enclosure about the space 124, between the cylindrical member 62 and the filter housing assembly 94. However, in order to observe the transmission of the light rays R2 through the outlet aperture 74 of the cylinder into the inlet aperture 98 of the filter housing assembly, the sleeve 128 may be retracted against the bias of the spring 130 and the light rays may be thus seen through the opening 126 in housing 14.

Spaced from bracket 78 and support member 114, along the length of the path of the light, is a second support member 132 which is adapted to support the other end of flow cuvette 118. Support member 132 has a stepped aperture 134 therein, through which the light rays R2 pass, to impinge on photo-electric device 136. Support member 132 is pivotally mounted to a support block or bracket 138, which has a compression spring 140 mounted therein as shown in FIGS. 2 and 6, for biasing support member 132 into engagement with flow cuvette 118. The pivoted support for support member 132 comprises a pivot pin 142 fitted into support bracket 138, at one end thereof, as best seen in FIGURE 3, the lower portion of member 132 fitting into a slot 133 in bracket 138. The other end of support bracket 138 has a slot 144 therein through which securing bolts 146 selectively fasten support bracket 138 to the base 12. For this purpose a plate 148 is provided to overlie the sides of slot 144. Due to slot 144, support bracket 138 is adjustable to insure alignment and registry of aperture 134 in support member 132 with aperture 116 in support member 114.

The light rays R2 focus at the focal point 76 and pass through the aperture 116, in support member 114, through the flow cuvette 118, through the aperture 134 in support member 132 and onto the photo-electric device 136. Photo-electric device 136 is supported on the base 12 by L-shaped bracket member 150, made out of a suitable plastic, the bracket member 150 being secured to the base 12 by securing elements 152. Photo-electric device 136 is mounted to bracket member 150 by nuts 154 which engage projecting screw members 156, spaces 158 being provided for this purpose. It will be noted from FIGURE 2 that photo-electric device 136 is laterally spaced from aperture 134 to form a space 160 through which the rays R2 are to pass from the cuvette 118 to the photo-electric device 136. Enclosing this space 160 is an annular sleeve or light-tight tubular member 162 slidably mounted on photo-electric device 136. A compression spring 164 is seated between bracket member 150 and annular sleeve 162, annular sleeve 162 abutting against ring member 166 which is mounted to support member 132 by securing elements 168. Ring member 166 has an aperture 170 therein in registry with aperture 134 in support member 132. It may be seen that space 160 provides a light-tight path for the rays R2 to pass from the flow cuvette 118 to the photo-electric device 136. If it is desired to observe the passage of these light rays from the cuvette to the photo-electric device, annular sleeve 162 may be pushed back against the biasing force of compression spring 164, to make space 160 available for viewing through opening 126 in housing 14. It will be understood from the following discussion that bracket member 150 for supporting the photo-electric device 136 may be moved to selectively adjust the position of the photo-electric device 136 along the length of the path of the light rays.

The previously identified flow cuvette 118 is supported within the colorimeter 10 on mounting means comprising the suport member 114 and the support member 132. The flow cuvette 118 is preferably made of glass and has a liquid input part or arm 172 and a liquid output part or arm 174. The input arm 172 is provided with a projecting nipple portion 176 to receive one end of an input tube 178 through which the liquid stream, containing the samples to be analyzed, are fed to the input arm 172. Both input arm 172 and output arm 174 extend in a vertical plane, the arms being spaced from each other, along the path of the light rays, with a horizontally extending, light-permeable, elongated tube member 180, disposed therebetween, in fluid communication with both input arm 172 and output arm 174. As explained in the previously identified patent, air is introduced into the analyzing apparatus with the various samples and processing media introduced therein so that the output of said analyzing apparatus, which is to be subjected to colorimetric examination, contains for each sample input a plurality of liquid segments which are separated by air segments. Consequently, the arm 172 is of a relatively large diameter so as to eliminate the air bubbles or segments between the various liquid segments, the air being released from the flow cuvette 118 through the upper end portion 182 of arm 172, above the nipple 176, said upper portion serving as a vent for the arm 172 and extending, through slot 184 in a cover 186, to the outside atmosphere. Cover 186 overlies opening 126 in housing 14, and is suitably mounted, by means not shown, for easy removal from housing 14. To help break up the liquid segments in the liquid stream from input tube 178, a projection 188 is provided in nipple 176 extending into the path of liquid flow of the incoming liquid stream.

At the bottom of input arm 172 of flow cuvette 118, the input arm tapers gradually as at 190, into the narrowed U-shaped or reflexed neck 192. Due to the gradual taper at 190 and the reflexed neck 192, various segments of the same sample blend together as they flow down the tapered portion 190 into the reflexed neck 192. The reflexed neck 192 communicates with a vertically extending tube 194, at the bottom portion thereof, said tube 194 being in fluid communication with one end 195 of horizontal tube member 180, as best seen in FIG. 5. It will be noted from FIG. 5 that the bottom portion of tube 194 has a projection 196 extending into the path of fluid flow from arm 194 into horizontal tube member 180. Projection 196 functions similarly to projection 188 in nipple 176 to help break up any liquid segments still existing in the stream of liquid. Horizontal tube member 180 constitutes the viewing tube through which light rays pass for viewing by the photo-electric device 136 to determine the concentration of the substance in the liquid sample being analyzed by the colorimeter. The other end, 198, of horizontal tube member 180 is in fluid communication with a reflexed neck portion 200 into which the liquid is discharged from horizontal tube member 180. Each of the ends 195 and 198 of tube member 180 is closed with a light-permeable material, such as glass, to prevent loss of liquid from the flow cuvette 118 and to permit passage of light therethrough. From reflexed neck portion 200 the liquid flows into the previously mentioned output arm 174 to be discharged through flexible discharge tube member 202. Mounted at end 198 of horizontal tube member 180, and a fluid communication therewith, is a vertically extending tube 204 which extends through hole 206 in cover 186 of housing 14, tube 204 thereby being exposed to atmosphere. At the upper end of output arm 174 there is a tube portion 208 connecting output arm 174 to tube 204. Tubes 204 and 194, respectively, constitute vent means for the flow cuvette 118, tube 194 venting air and other gaseous fluids which may be trapped at, or carried into, reflexed neck 192, whereas tube 204 provides venting means for eliminating gaseous fluids found in the liquid in tube member 180 due to the heating effect of the light from electric light source 34. To prevent outside light from entering the housing 14 through openings 184 and 206 in cover 186, a suitable light shield 210 is provided for hole 206, and a light shield 212 is provided to cover opening 184. Vent portion 182 of input arm 172 and vent tube 194 are connected to each other by the tubular portion 214, which constitutes an air equalization connecting member for equalizing the hydrostatic pressure in the arm 172 and tube 194 of the flow cuvette to prevent surging of the liquid between those two parts of the flow cuvette. An integral reinforcing rib 216 is provided between the input arm 172 and the vent tube 194, at the lower portions thereof. Another reinforcing rib 218 is provided between the lower portions of the reflexed neck portion 200 and the output arm 174 of the flow cuvette 118. Dam portion 220 at the upper portion of reflexed neck 192 determines the liquid level in input arm 172 and dam portion 222 at the upper portion of reflexed neck portion 200 determines the liquid level in vent tube 204.

Flow cuvette is supported in the colorimeter 10 at each of the ends 195 and 198, respectively, of light-permeable, horizontally extending, elongated tube member 180. As best seen in FIG. 2, end 198 is provided with a rim 199 which fits into a complementary recess in aperture 116 of support member 114, and the other end 195 of tube member 180 is also provided with a rim 201, as best seen in FIG. 5, which fits into a complementary recess formed in aperture 134 of support member 132. As best seen in FIG. 4, a nipple 224 is provided to support the discharge end 226 of output arm 174, nipple 224 extending through an opening 228 in the base 12 of colorimeter 10. Nipple 224 projects through a hole 230 formed in the short leg 82 of L-shaped bracket 78. A passageway 232 is provided along the length of nipple 224 for discharge of liquid therethrough into flexible discharge tube member 202. Mounted on the upper end of nipple 224 is a flexible rubber cap 234 which receives the discharge end 226 of outlet arm 174, rubber cap 234 resiliently supporting said end 226. A wire 236 fastens the rubber cap 234 to the nipple 224.

The previously mentioned horizontal tube member 180 comprises the viewing tube member of the flow cuvette 118 and is accordingly light-permeable. Support member 114 may be adjusted along the length of the path of light travel, in order to assure that the focal point 76 falls on the end 198 of tube member 180, as shown in FIG. 2. This may be accomplished by loosening the securing members 90 and moving L-shaped bracket 78, along the path of the light, toward or away from the light source 34. It will be understood that projecting member 84 in the undersurface of bracket 78 will guide the movement of bracket 78 along the path of the light. When the flow cuvette 118 is properly positioned with respect to the focal point 76, securing members 90 may be tightened. In this regard it will be noted that opening 228 in base 12 is large enough to permit movement of the nipple 224 in bracket 78, as the flow cuvette 118 is adjusted to position the end 198 at the focal point 76 of the light rays R2. Support member 132 for the other end 191 of horizontal tube member 180 may also be easily adjusted by loosening securing bolts 146 and adjusting support bracket 138 as desired. If it is desired to remove the flow cuvette 118 from the colorimeter 10, the upper portion of support member 132 may be moved to the right, as viewed in FIG. 2, pivoting the member about pivot pin 142 to release end 195 from its support and then the flow cuvette 118 may be lifted out of the colorimeter 10. Thus it will be seen that convenient means have been provided for adjusting and releasably locking the flow cuvette 118 for mounting and supporting the flow cuvette in the colorimeter.

The proper length of horizontal tube member 180 and accordingly the proper length of the light path through the liquid being analyzed depends upon the concentration of substances in the liquid under test. For low concentration of substances in the liquid under test, a longer light path is desired whereas for higher concentrations of substances in liquids under test a shorter light path is desired. By providing a long light path for liquids having small concentrations of substances therein, there will result increased absorption of the light by the liquid sample, accomplished with the utilization of a minimum amount of liquid sample. This is extremely desirable especially in cases where relatively small amounts of the sample liquid are available for analysis, for example, and not by way of limitation, in the case of analysis of a blood sample taken from an infant. In addition, if short light paths were provided for liquids having a low concentration of substances therein, such as impurities in boiler feed water, only a relatively small amount of the light passing through the liquid sample will be absorbed resulting in small increment differences on the recording apparatus for differences between liquids having low concentrations of substances therein. Pursuant to this feature of the invention, means are provided in the colorimeter 10 for supporting flow cuvettes having varying lengths of horizontal viewing tubes. In the illustrated embodiment of the invention, means have been provided for employing flow cuvettes of three varying lengths but it will be understood that any number of various sizes of flow cuvettes may be used.

With particular reference to FIG. 6, there is shown three pairs of tapped holes in base 12, each tapped hole being designated by the reference numeral 238, each pair of tapped holes 238 being positioned from support member 114, in the three positions indicated at B, C, and D, respectively. Position B indicates the position to which bracket 138, carrying support member 132, may be moved for supporting a flow cuvette having a short horizontal tube member 180. Position C indicates a position for an intermediate sized flow cuvette, and position D indicates a position for the longest sized flow cuvette, the longest sized flow cuvette 118 being in position D as shown in FIG. 2. Securing bolts 146 are screwed into the tapped holes 238 to selectively position supporting member 132 in any of the positions indicated. In addition, another group of tapped holes 240 is provided in base 12 for selectively positioning L-shaped bracket member 150 which supports photo-electric device 136, the position for tapped holes 240, corresponding to the positions for tapped holes 238, being designated in FIG. 6 by B', C' and D', respectively. It will be clear from the foregoing that when a cuvette is employed having a short length of tube member 180, bracket 138 will be mounted to the base 12 at the first pair of tapped holes 238 at position B, and L-shaped bracket member 150, carrying photo-electric device 136, will be fastened to base 12 at the first pair of tapped holes 240 at position B'. Correspondingly, if a longer or intermediate length tube member 180 is employed, bracket 138 and bracket member 150 may be moved to position C', it being understood that the lengths corresponding to the three positions indicated in FIG. 6 will correspond to the varying lengths of the horizontal tube member 180 of the flow cuvette.

Since the flow cuvette 118 projects through the cover 186, it is necessary to provide three different covers, each cover being provided with openings therein, to correspond with a particular flow cuvette used, it being understood that the overall length of each cover may be the same as shown in FIG. 7. FIG. 7 illustrates the three covers 186 to be used to correspond with the three different sized cuvettes used corresponding to the positions illustrated in FIG. 6; cover 186B corresponding to the position B in FIG. 6, cover 186C corresponding to the position C in FIG. 6, and cover 186D corresponding to the position D in FIG. 6. The cover 186D, illustrated in FIG. 7, corresponds to the cover 186 for the flow cuvette 118 illustrated in FIGS. 1 through 5, and as previously described has a hole 206 therein through which tube 204 projects, and a slot 184 through which tube 194, upper portion 182 of input arm 172, and nipple 176 projects. Similar holes and slots are provided for each of the other covers 186B and 186C, cover 186B being provided with hole 206B and slot 184B which are continuous with each other. Thus it will be seen from the foregoing that when a different sized flow cuvette 118 is employed, support member 132 will be moved into its proper position and a corresponding cover 186 for that particular cuvette, having a hole 206 and a slot 184, positioned to accommodate the projecting parts of the cuvette, will be used.

An invention illustrating and describing some of the features disclosed in the present application is shown in U.S. Patent No. 2,999,417 issued Steptember 12, 1961.

Certain features shown and described but not claimed in this application are claimed in my divisional application, Serial No. 161,174 filed December 21, 1961.

While I have shown and described the presently preferred embodiment of the invention, it will be understood that the invention may be embodied otherwise than as herein specifically illustrated or described and that in the illustrated embodiment certain changes in the details of construction and in the form and arrangement of parts may be made without departing from the underlying idea or principles of the invention. Accordingly, I do not wish to be limited to the precise construction shown or described herein, except as may be required by the scope of the appended claims.

Having thus described my invention, what I claim and desire to secure by Letters Patent, is:

1. In a colorimeter, a housing having therein a source of light, a photo-electric device disposed in the light path from said source, and a flow cuvette mounted between said light source and said photo-electric device, said flow cuvette comprising a liquid inlet part, a liquid outlet part horizontally spaced from said liquid inlet part, and a horizontally extending elongated light-permeable liquid receiving tube in liquid flow communication with said inlet and outlet parts and disposed therebetween, said inlet part comprising a vented inlet tubular member, a tubular portion interconnecting the lower end of said inlet member and one end of said liquid receiving tube in liquid flow communication with each other, tubular means providing a vent opening above said one end of said liquid receiving tube, said outlet part comprising a vented outlet tubular member connected to the opposite end of said liquid receiving tube, and other tubular means providing a vent opening above said opposite end of said liquid receiving tube.

2. In a colorimeter, a housing having therein a source of light, a photo-electric device disposed in the light path from said source, and a flow cuvette mounted between said light source and said photo-electric device, said flow cuvette comprising a liquid inlet part, a liquid outlet horizontally spaced from said liquid inlet part, and a horizontally extending elongated light-permeable liquid receiving tube in liquid flow communication with said inlet and outlet parts and disposed therebetween, said inlet part comprising a vertically extending vented tubular member, a reflexed tubular part interconnecting the lower end of said inlet member and one end of said liquid receiving tube in liquid flow communication with each other, tubular means providing a vent opening above said one end of said liquid receiving tube, said outlet part comprising a vertically extending vented outlet tubular member, another reflexed tubular part interconnecting the opposite end of said liquid receiving tube and said outlet member in liquid flow communication with each other, and other tubular means providing a vent opening above said opposite end of said liquid receiving tube.

3. In a colorimeter, a housing having therein a source of light, a photo-electric device disposed in the light path from said source, and a flow cuvette mounted between said light source and said photo-electric device, said flow cuvette comprising a liquid inlet part, a liquid outlet part horizontally spaced from said liquid inlet part, and a horizontally extending elongated light-permeable liquid receiving tube in liquid flow communication with said inlet and outlet parts and disposed therebetween, said inlet part comprising a vented inlet tubular member, a tubular portion interconnecting the lower end of said inlet member and one end of said liquid receiving tube in liquid flow communication with each other, a vertically extending tube connected at its lower end to said one end of said liquid receiving tube and having a vent opening to vent said liquid receiving tube at said one end thereof, said outlet part comprising a vented outlet tubular member connected to the opposite end of said liquid receiving tube, and another vertically extending tube connected at its lower end to said opposite end of said liquid receiving tube and having a vent opening to vent said liquid receiving tube at said opposite end thereof.

4. In a colorimeter, a housing having therein a source of light, a photo-electric device disposed in the light path from said source, and a flow cuvette mounted between said light source and said photo-electric device, said flow cuvette comprising a liquid inlet part, a liquid outlet part horizontally spaced from said liquid inlet part, and a horizontally extending elongated light-permeable liquid receiving tube in liquid flow communication with said inlet and outlet parts and disposed therebetween, said inlet part comprising a vented inlet tubular member, a tubular portion connected to the lower end of said inlet member and extending above one end of said liquid receiving tube and connected to said one end in liquid flow communication therewith, tubular means providing a vent opening above said one end of said liquid receiving tube, said outlet part comprising a vented outlet tubular member, another tubular portion connected to said outlet member at a point which is above said liquid receiving tube and extending below the opposite end of said liquid receiving tube and connected to said opposite end in liquid flow communication therewith, and other tubular means providing a vent opening above said opposite end of said liquid receiving tube.

5. In a colorimeter, a housing having therein a source of light, a photo-electric device disposed in the light path from said source and a flow cuvette mounted between said light source and said photo-electric device, said flow cuvette comprising a liquid inlet part, a liquid outlet part horizontally spaced from said liquid inlet part, and a horizontally extending elongated light-permeable liquid receiving tube in liquid flow communication with said inlet and outlet parts and disposed therebetween, said inlet part comprising a vented inlet tubular member, a tubular portion connected to the lower end of said inlet member and extending above one end of said liquid receiving tube and connected to said one end in liquid flow communication therewith, tubular means providing a vent opening above said one end of said liquid receiving tube, said outlet part comprising a vertically extending outlet tubular member, another tubular portion connected to said outlet member at a point which is above said liquid receiving tube and extending below the opposite end of said liquid receiving tube and connected to said opposite end in liquid flow communication therewith, a vertically extending tube connected at its lower end to said opposite end of said liquid receiving tube and having a vent opening, and tubular means interconnecting said outlet member and said vertically extending tube above said other tubular portion for venting said outlet part.

6. In a colorimeter, a housing having therein a source of light, a photo-electric device disposed in the light path from said source, and a flow cuvette mounted between said light source and said photo-electric device, said flow cuvette comprising a liquid inlet part, a liquid outlet part horizontally spaced from said liquid inlet part, and a horizontally extending elongated light-permeable liquid receiving tube in liquid flow communication with said inlet and outlet parts and disposed therebetween, said inlet part comprising a vented inlet tubular member, a tubular portion interconnecting the lower end of said inlet member and one end of said liquid receiving tube in liquid flow communication with each other, tubular means providing a vent opening above said one end of said liquid receiving tube, said outlet part comprising a vented outlet tubular member connected to the opposite end of said liquid receiving tube, and other tubular means providing a vent opening above said opposite end of said liquid receiving tube, said liquid receiving tube having enlarged portions at its opposite ends which provide supports for mounting said flow cuvette in said housing.

7. In a colorimeter, a housing having therein a source of light, focusing means for said light, a photo-electric device disposed in the light path from said source, and a flow cuvette mounted between said light source and said photo-electric device, said flow cuvette comprising a liquid inlet part, a liquid outlet part horizontally spaced from said liquid inlet part, and a horizontally extending elongated light-permeable liquid receiving tube in liquid flow communication with said inlet and outlet parts and disposed therebetween, said inlet part comprising a vented inlet tubular member, a tubular portion interconnecting the lower end of said inlet member and one end of said liquid receiving tube in liquid flow communication with each other, tubular means providing a vent opening above said one end of said liquid receiving tube, said outlet part comprising a vented outlet tubular member connected to the opposite end of said liquid receiving tube, other tubular means providing a vent opening above said opposite end of said liquid receiving tube, and means for moving said flow cuvette transversely of said light path for positioning said liquid receiving tube in the path of the light and for moving said flow cuvette longitudinally of said light path to position said liquid receiving tube at the focal point of said light path.

8. In a colorimeter, a housing having therein a source of light, a photo-electric device positioned in the path of the light from said source, a flow cuvette, and means for supporting said flow cuvette between said light source and said photo-electric device, said flow cuvette comprising a liquid inlet part, a liquid outlet part horizontally spaced from said inlet part, and a horizontally extending elongated light-permeable liquid receiving tube in liquid flow communication with said liquid inlet and outlet parts and disposed therebetween, said supporting means comprising a first support member for supporting said flow cuvette at one end of said liquid receiving tube, and a second support member spaced horizontally from said first support member for supporting said flow cuvette at the opposite end of said liquid receiving tube, means for adjustably securing said second support member at different horizontal distances from said first support member for accommodating different lengths of liquid receiving tubes, and means for adjustably securing said photo-electric device at different horizontal distances from said light source in accordance with the different lengths of the liquid receiving tubes.

References Cited in the file of this patent
UNITED STATES PATENTS

| 1,504,770 | Lieber | Aug. 12, 1924 |
| 2,232,169 | Diller | Feb. 18, 1941 |
| 2,301,401 | Hennessy et. al. | Nov. 10, 1942 |
| 2,496,333 | Cary et at. | Feb. 7, 1950 |
| 2,594,113 | Askin | Apr. 22, 1952 |
| 2,630,735 | Rouy | Mar. 10, 1953 |
| 2,649,011 | Black | Aug. 18, 1953 |
| 2,704,007 | Greif | Mar. 15, 1955 |
| 2,797,149 | Skeggs | June 25, 1957 |
| 2,859,757 | Parsons | Nov. 11, 1958 |